July 8, 1941.  H. S. PIERCE  2,248,189
POWER TRANSMISSION CHAIN
Filed April 8, 1940  3 Sheets-Sheet 1
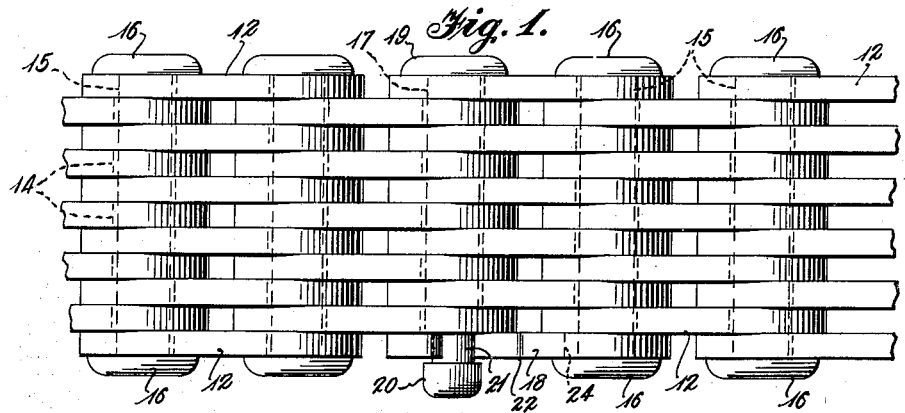
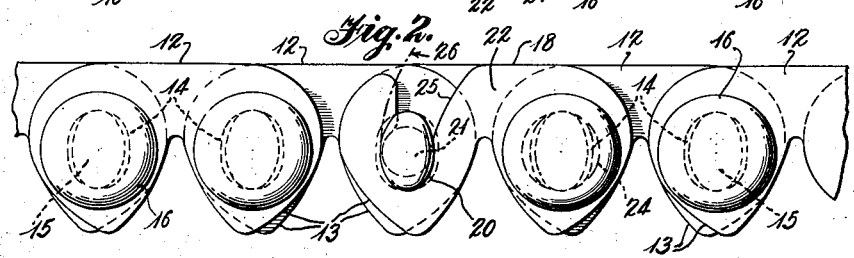
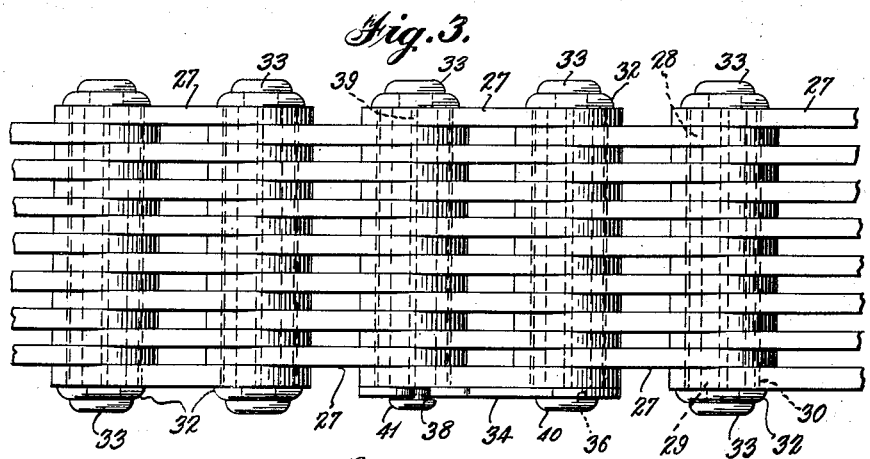
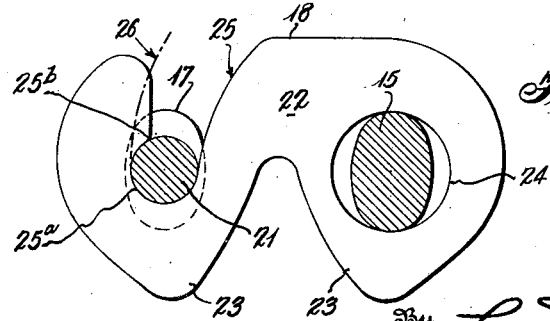
Inventor
*Harold S. Pierce*
By
Attorney

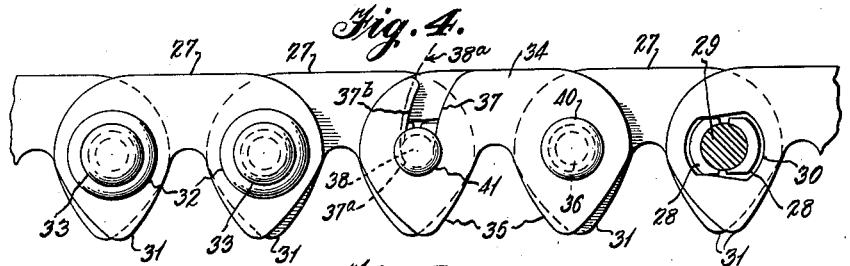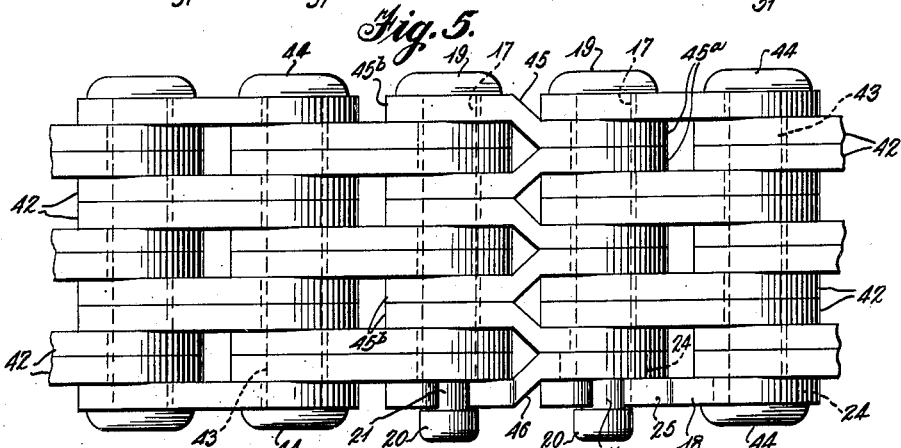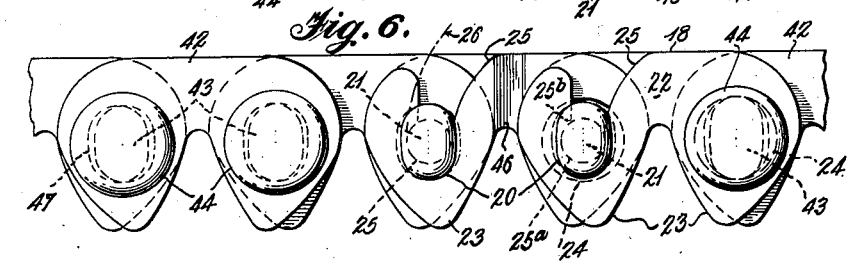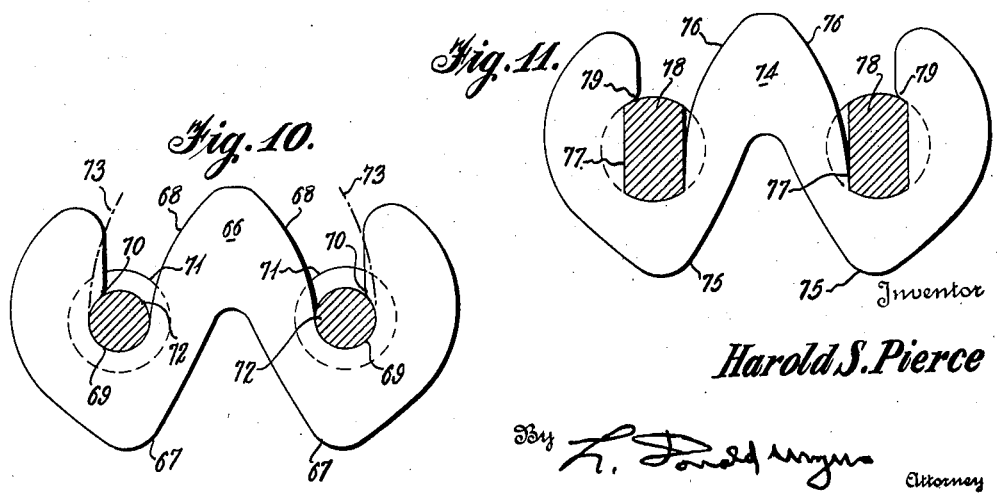

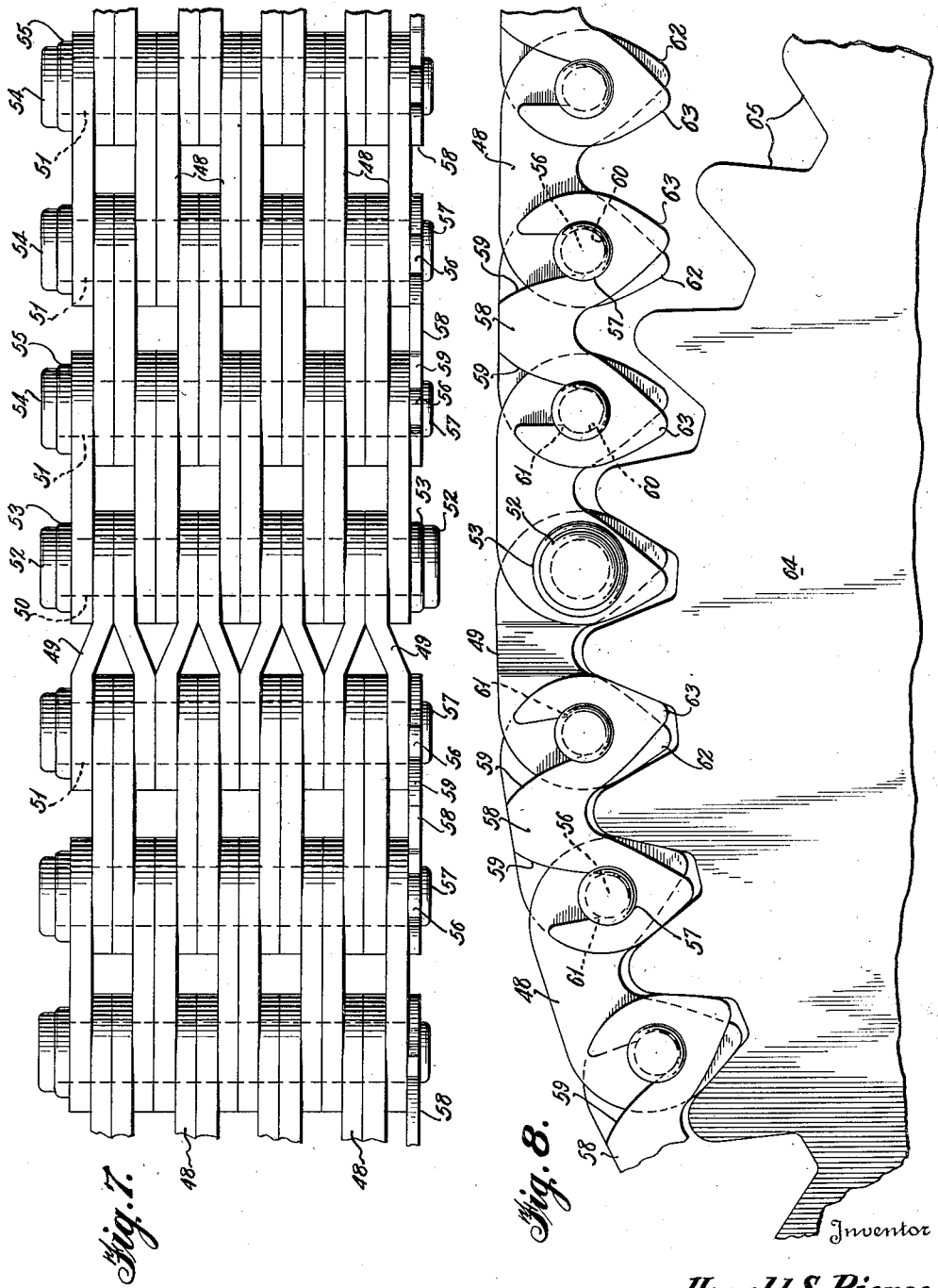

Patented July 8, 1941

2,248,189

UNITED STATES PATENT OFFICE 2,248,189

POWER TRANSMISSION CHAIN

Harold S. Pierce, Indianapolis, Ind., assignor to Link-Belt Company, a corporation of Illinois Application April 8, 1940, Serial No. 328,567

8 Claims. (Cl. 74—250)

This invention relates to new and useful improvements in power transmission chains and deals more particularly with coupling devices for chains of the silent type.

It is the common practice of manufacturers to deliver silent chains either with all joints riveted or with one open joint which is riveted when the chain is applied to the wheels of its drive. After the original application is made, it is necessary to drive out the pin of one of the riveted joints every time the chain is uncoupled. This operation, naturally, renders unfit for further service the removed pin, and a new pin must be employed when the chain is recoupled. Whenever the chain is uncoupled for the purpose of either shortening or lengthening the same by one or more pitches, or transversely aligned sets of link elements, three or more chain pins are involved in the operation. That is, when the chain is shortened by one pitch, or set of elements, two pins must be driven out and one new pin inserted and riveted in place. When the chain is lengthened by one pitch, one pin must be driven out and at least two new pins inserted and riveted.

These procedures naturally require the services of a maintenance man of at least fair mechanical ability and the machine in which the chain is used must be shut down during the servicing period. If the uncoupling of a silent chain is not performed at fairly frequent intervals, due to the use of only one or some other small number of such chains, there is a real likelihood that spare pins will not be available when they are needed and a further delay will be experienced while the pins are being obtained.

Extremely small silent chains are being very extensively used in many machines and devices employing fractional horsepower drives. A popular pitch size for chains used in such machines is $\frac{3}{16}$ of an inch. The driving out of old pins and the riveting of new pins of the size employed in such small chains is a rather delicate operation and, due to the conditions under which the work oftentimes must be performed, is more time consuming for the average mechanic than would be the case if he were handling larger sized elements.

With certain types of machines it is essential that an operator of limited mechanical ability be able to quickly handle chain manipulation; i. e., uncoupling and recoupling while making repairs and/or adjustments. Modern moving picture projecting machines with sound reproduction are a striking example of this type of machine. Any delay in handling adjustments or repairs on such machines which results in interrupting a show is extremely objectionable as is invariably evidenced by the display of impatience on the part of the audience.

It would appear that the above noted difficulties could be readily overcome by following the practice employed in connection with other types of chains, i. e., by using washers and cotters in place of riveting the ends of the pin or pins employed in uncoupling and recoupling. Such a practice could be adopted and would be satisfactory for large, heavy chains. With the extremely small chains having such a short pitch as $\frac{3}{16}$ of an inch, however, the washers and cotters would be so very small and delicate to handle that they continually would be damaged or lost. Therefore, cotters cannot be substituted for riveted pin ends in solving the problem. Thought has been given to the possibility of making the washers and cotters oversized in proportion to the remaining elements of a chain assembly so that they could be more easily handled. Such a procedure, however, would possess at least two serious disadvantages.

1. The oversize elements would provide a pitch, or a group of pitches, of relatively greater weight than the remaining pitches of the chain which would produce an unbalanced circumferential condition. Such a chain, also, would be unbalanced transversely because the oversize elements normally would only be used on one side of the chain. This unbalanced condition would produce rough chain action and spot wear. Such an unbalanced chain condition would be prohibitive in sound motion picture projecting machines where smooth, uniform action is essential or distortion in sound reproduction will result.

2. Silent chains are of substantially the same width as their wheels and each link element is required to arch over its respective teeth. The link elements or leaves for chains of $\frac{3}{16}$ of an inch pitch are of such small dimensions that washers or cotters made sufficiently oversized to provide for easily handling would project beyond the edges of the link elements and would prevent proper meshing with the teeth of the wheels.

It is the primary object of this invention to provide coupling means which will permit silent chains of any pitch to be quickly and easily uncoupled and recoupled by persons having limited mechanical ability without requiring the use of any new parts, such as chain pins which must be riveted to be maintained in place.

A further important object of the invention is to provide coupling means which are particularly suitable for use with silent chains of very short pitch because the set or sets of link elements involved will be properly balanced transversely of the chain and will possess the same weight as the remaining sets of link elements, thereby permitting the chain action to be smooth and uniform.

Another important object of the invention is to provide coupling means which will permit equipped silent chains to be uncoupled and recoupled or varied in length by either an odd or an even number of pitches without involving the destruction of any riveted pins or the riveting of any new pins.

Still another primary object of the invention is to provide coupling means for silent chains which may be incorporated in chains now in service merely by substituting one or more new pins and special coupling link elements for certain of the old pins and link elements.

A still further important object of the invention is to provide novel forms of coupling elements which are of such construction as to be assisted in maintaining their intended operating positions with the chains running on wheels by both centrifugal force and the action in contacting the wheels.

Other objects and advantages of the invention will be apparent during the course of the following description.

In the accompanying drawings forming a part of this specification and in which like numerals are employed to designate like parts throughout the same, Figure 1 is a plan view of one conventional type of silent chain with one form of coupling means, embodying this invention, applied thereto, Figure 2 is a side elevational view of the structure disclosed in Fig. 1, Figure 3 is a plan view of a section of a different standard type of silent chain with a slightly modified form of coupling means, embodying this invention, incorporated therein, Figure 4 is a side elevational view of the structure disclosed in Fig. 3.

Figure 5 is a plan view of a section of a still further type of standard silent chain with coupling means embodying this invention incorporated therein, Figure 6 is a side elevational view of the structure disclosed in Fig. 5, Figure 7 is a plan view of a section of standard silent chain with a still further modified form of coupling means, embodying this invention, incorporated therein, Figure 8 is a side elevational view of the structure shown in Fig. 7 with the chain running on a sprocket wheel, Figure 9 is a detail elevational view of a coupling link element which is incorporated in the chain structures disclosed in Figs. 1, 2, 5, and 6, Figure 10 is a view similar to Fig. 9 but illustrates the form of special coupling link element incorporated in the chain structure of Figs. 7 and 8, and Figure 11 is a view similar to Fig. 10 but illustrates a modified form of special coupling link element which may be employed in place of the coupling link elements disclosed in Figs. 7 and 8.

Before proceeding with a detailed description of the various chain structures and coupling means disclosed in the several figures, it is believed to be desirable to set forth a brief explanation regarding the disclosures of several standard forms or types of silent chains. In my prior Patent No. 2,047,833, issued July 14, 1936, there are disclosed improvements relating to two standard types of chains. One of these types of chains is known to the trade as the "liner" type in which liner members are associated with the joint pins and are interposed between the peripheries of the pins and the bearing or contact portions of the walls of the pitch holes or pin apertures formed in the various link elements. Merely for the sake of indicating that the latching means embodying this invention is applicable to this "liner" type of silent chain joint structure, Figs. 3 and 4 of the drawings in a general way illustrate this type of chain.

In the second standard type of silent chain, the liners are omitted from the joint structures and the walls of the pin holes or apertures formed in the various link elements bear directly on the peripheries of the chain or joint pins. To provide a certain degree of play or slackness at the joints, the pins are of substantially oval or elliptical shape in section and the pin holes or apertures formed in the link elements are made oversize relative to the dimensions of the pins. This type of silent chain joint structure is illustrated or employed in connection with the chains disclosed in Figs. 1, 2, 5, and 6.

The chain of Figs. 7 and 8 intentionally has been illustrated without specifically disclosing any particular form of joint structure other than to disclose chain pins received in pin holes or apertures formed in the link elements for pivotally connecting the sets of elements or leaves. It is to be understood that the various forms of coupling means, and more specifically the coupling link elements, may each be employed with each one of the illustrated types of silent chains, although the drawings fail to fully disclose this universal application.

In the drawings, wherein for the purpose of illustration are shown the preferred embodiments of this invention, and particularly referring to Figs. 1, 2, and 9, the reference character 12 is employed for designating each one of the link elements or leaves. These link elements or leaves are assembled in transversely aligned sets, or pitches. Each link element 12 is illustrated in Fig. 2 as being of conventional construction and as including the two, spaced teeth 13, one at each end of the link element. These teeth are spaced so that each link element will arch over the teeth of the sprocket wheels on which the chain runs. Pin holes or apertures 14 are provided in each end portion of each link element to receive the chain or joint pins 15. Figs. 2 and 9 disclose the pins 15 as being substantially oval shaped in transverse cross section. The chain or joint pins 15 which are not involved in the means incorporated in this chain structure for permitting ready uncoupling and recoupling of the chain are riveted at their opposite ends 16.

The coupling means incorporated in this chain structure includes a special form of chain pin 17 and a special form of coupling link element 18. The chain or joint pin 17 is provided with a conventional or standard form of riveted end 19 at one of its extremities. At the other extremity, the coupling pin 17 is provided with a transversely reduced but axially thickened head portion 20 which is separated from the main body portion of the coupling pin by means of a truly cylindrical, reduced portion 21.

The special coupling link element 18 is clearly illustrated in the three figures and particularly Fig. 9. This coupling link element includes a main body or back portion 22 having the spaced teeth 23 depending or projecting from its opposite ends. These teeth are spaced to permit the coupling link element to arch over the sprocket wheel teeth in the same manner as the remaining link elements 12 of the chain assembly. One end portion of the coupling link element is provided with a pitch hole or pin aperture 24 of truly circular formation and has a diameter which equals the major transverse dimension of a chain pin 15. This type of pitch hole or pin aperture will permit the coupling link 18 to pivot or swing around the chain or joint pin 15 received therein. Figs. 1 and 2 disclose this pin as being riveted at 16 so as to retain the coupling link element on the pin while it is permitted to pivot or swing.

The remaining end portion of the coupling link element 18 is provided with a slot 25 which enters the main body 22 from its top or back edge and extends transversely thereof. The inner end portion 25a of this slot is shaped to provide a journal portion for the reduced, truly cylindrical part 21 of the special coupling pin 17. Between this journal portion 25a and the outer end of the notch 25, or the top or back edge of the coupling link body, the notch 25 is constricted or reduced in diameter due to the presence of the integral projection or enlargement 25b. This projection or enlargement lies in the path of the pin portion 21 when the coupling link element 18 is swung or pivoted around the joint pin 15 in an inward direction to cause the pin portion 21 to travel outwardly through the slot 25 toward the top or back edge of the coupling link. The extent to which this projection or enlargement 25b obstructs the movement of the reduced pin part 21 is illustrated by the dash line 26 which is struck from or formed on a radius of the axis of the chain or joint pin 15 received in the hole or aperture 24.

It will be appreciated that this enlargement or projection 25b normally will function to retain the coupling link element 18 locked or frictionally held with the pin part 21 in the journal portion 25a of the slot 25. To locate the reduced pin portion 21 in this journal portion 25a, the pin portion 21 must be snapped past the projection or enlargement 25b. The reduced pin portion 21 also must be forced or snapped past this projection or enlargement 25b when the coupling link 18 is pivoted around its joint pin 15 for disconnecting the coupling link element from the coupling pin 17. This uncoupling swinging or pivoting of the link element 18 must be in an inward direction or in a direction toward the wheels over which the chain runs. It will be appreciated, therefore, that the contacting of the coupling link element 18 with its wheels will oppose any uncoupling or inward swinging movement of the coupling link element and will, therefore, supplement the locking action of the projection or enlargement 25b. Additionally, the centrifugal force exerted against the coupling link element 18 during the running of the chain will tend to keep the reduced coupling pin portion 21 in the journal portion 25a of the slot 25 and will, also, supplement the locking action of the projection or enlargement 25b.

When it is desired to uncouple a chain equipped with this coupling means, it merely is necessary to force the coupling link element 18 to swing inwardly around the joint pin 15 so that the reduced portion 21 of the coupling pin will snap past the projection or enlargement 25b into the outer portion of the slot 25. When the coupling link element 18 is moved sufficiently to entirely free the coupling pin 17, this pin may be completely withdrawn from the holes or apertures of the conventional link elements 12 through which it passes and the chain is uncoupled. To recouple the chain, it merely becomes necessary to reinsert the coupling pin 17 and to swing the coupling link element 18 about its conventional joint pin 15 until the reduced portion 21 of the coupling pin snaps past the enlargement or projection 25b into the journal portion 25a of the slot.

By carefully considering the disclosure of Fig. 1, it will be seen that the various conventional link elements 12 of adjacent sets alternate in bearing on the joint pins 15 and the coupling pin 17. The coupling link element 18 takes the place of one of the conventional link elements 12 at the end of its set of elements. The coupling link element, therefore, will in no way unbalance the chain assembly. The head 20 of the coupling link element 17, due to its increased thickness but reduced width, weighs the same or substantially the same as the riveted head or end 19 located at the opposite extremity of the coupling pin 17. The coupling pin construction, therefore, will not result in throwing the chain out of balance.

Referring now particularly to Figs. 3 and 4, it will be seen that the chain is made up of sets of conventional link elements 27 which alternate in bearing on the joint structures or parts. As was briefly explained above, this silent chain is of the liner type and includes the liner members 28 in the joint structures or parts. These liners bear directly on the chain or joint pins 29 and extend longitudinally of opposite sides thereof. The pins 29 and liners 28 are received in pitch holes or joint apertures 30 formed in the opposite end portions of the link elements 27. Spaced wheel engaging teeth 31 are provided on the opposite end portions of the link elements. These teeth are spaced so that the elements may arch over the teeth of the wheels on which the chain runs.

The conventional joint pins 29 are provided with washers 32 at their opposite ends for overlying the ends of the liners 28 to retain these liners in place. The extremities of the pins are riveted at 33, to maintain the joint parts properly assembled and the link elements bear alternately on the joint parts.

The coupling means of this structure differs somewhat from the coupling means disclosed in Figs. 1, 2, and 9. The coupling link element 34 is clearly disclosed in Fig. 3 as being arranged at an end of one of the sets of conventional link elements 27 but being provided in addition to the usual number of conventional elements. In other words, this coupling link element 34 overlies the outer face of the conventional end link element of the set. Therefore, it lies in the plane of the washers 32 on its side of the chain assembly and takes the place of these washers on the two joint pins, or the conventional joint pin and the coupling pin for its particular set of link elements.

This coupling link element 34 is provided with spaced teeth 35 which are arranged to arch over the sprocket wheels on which the chain runs.

One end portion of the coupling link element is journaled for swinging or pivotal movement on the reduced end portion 36 of a conventional chain pin 29. The remaining end portion of the coupling link element is provided with a slot 37 which extends transversely or inwardly from the back or top edge of the coupling link body. The inner portion of this slot 37 acts as a journal 37a for receiving the reduced portion 38 of the coupling pin 39. Outwardly of this journal portion 37a, the slot is constricted or reduced in diameter by the portion 37b which lies inwardly of the dash line 38 that is struck from the axis of the chain pin 29 on which the coupling link 34 is pivotally or swingably mounted. This constricting of the slot 37 functions to retain the coupling link element 34 in position with the reduced coupling pin portion 38 positioned in the journal portion 37a of the slot 37. Like the coupling link element of Figs. 1, 2, and 9, contact of the coupling link element 34 with the wheels over which the chain runs will supplement the frictional locking action provided between the coupling pin 39 and the walls of the slot 37. Centrifugal force, also, will supplement the locking action of the coupling link element and the coupling pin in retaining the element 34 in position. By considering Fig. 3, it will be noted that the coupling link element 34 is retained on the conventional chain pin 29 on which it is pivotally mounted by means of riveting of this pin at 40. The non-latching end of the coupling joint pin 39 is riveted in the conventional manner, as at 33. The latching end of the coupling pin 39 is provided with an enlarged head 41 to retain the slotted end of the coupling link element 34 against axial movement relative to the coupling pin 39. To uncouple and recouple the coupling link 34 with respect to the coupling pin 39, the said coupling link may be moved out of and into locking engagement with the reduced end portion 38 of the coupling pin 39. When the coupling link 34 is out of coupling or locking engagement with the coupling pin, the said pin may be withdrawn from the liners 28 of its joint structure. Recoupling of the parts will be readily understood.

It will be appreciated by inspecting Fig. 3 that the head 41 on the coupling pin 39 is smaller and lighter than the riveted head 33 on the opposite end of this pin and that the relatively thin coupling link element 34 takes the place of the washers 32 at the opposite ends of the two pins 29 and 39 with which the coupling link element is associated. These differences in construction between the two sides of the chain at the point of uncoupling and recoupling will provide a transversely balanced condition. Also, the pitch, or set of link elements employed in uncoupling and recoupling the chain will be balanced with or will weigh the same as the remaining pitches or sets of chain elements making up the balance of the chain assembly.

It oftentimes is extremely desirable to have a silent chain assembly which may be readily and quickly modified in length by either an odd number or an even number of pitches, or sets of link elements. All chain assemblies will stretch, or increase in length, during service as a result of wear at the joints. In many types of installations, it is impossible to take up the stretch or slack in a chain by increasing the distance between the centers of the sprocket wheels. In such cases, increases in the lengths of the chains must be taken care of by removing sets of link elements. In other installations, it is desirable to be able to change the ratio of transmission at fairly frequent intervals by employing different sized wheels on one of the shafts and without changing the centers. To accomplish this result, it is necessary to add and subtract several sets of link elements. The types of chains disclosed in Figs. 5 to 8, inclusive, incorporate the coupling features of this invention in such a way as to make it possible to quickly and easily modify the length of a chain by either odd or even numbers of pitches.

Considering first the chain assembly of Figs. 5 and 6, it will be noted that the main or major portion of the chain assembly is made up of link elements 42 which are arranged in pairs. Alternate pitches or sets of these link elements include or consist of three pairs of elements. The remaining pitches or sets are made up of two intermediate pairs of link elements with single link elements arranged at the opposite sides of the sets. The joint or chain pins employed in this assembly are of the same construction as was described in connection with Figs. 1, 2, and 9. These chain pins are designated by the reference character 43. The chain pins not involved in the coupling means are riveted at their opposite ends, as at 44.

This particular chain assembly is constructed to permit one pitch, or set of link elements, to be quickly and easily removed. Of course, the same pitch or set of elements may be replaced just as quickly and easily. To provide for this removal of a single pitch, or set of link elements, the offset link elements 45 are provided. By inspecting Fig. 5, it will be seen that these offset link elements are so arranged that at one end of the set the end portions 45a of the elements are arranged in three pairs. The remaining end portions 45b of the elements are arranged in two intermediate pairs, while single end portions are provided at the opposite sides of this particular joint of the set. Therefore, when this set of offset links 45 is removed from the assembly, the remaining, conventional link elements 42 will be arranged so that they may be interfitted to form a new joint.

The coupling means of this assembly corresponds with the coupling means of Figs. 1, 2, and 9 with but one exception. This exception relates to the set of offset links 45. For this set of link elements, an offset coupling link 46 is provided. The second coupling link employed in this assembly is of identical construction to the link shown in Fig. 9, and for that reason the same reference character will be applied thereto. Other than being offset intermediate its ends, the offset coupling link 46 is of the same construction as the coupling link shown in Fig. 9 and, for that reason, the remaining reference characters employed in this figure will be applied to the offset coupling link 46.

The conventional link elements 42 are provided with the usual spaced teeth 46 while oval pitch holes or pin apertures 47 are provided in the end portions of the same to receive the conventional joint pins 43. The two pins which cooperate with the straight or flat coupling link element 18 and the offset coupling link element 46 are of the same construction as the coupling pin 17 of Fig. 1, and for that reason the same reference characters will be applied thereto.

In manipulating the coupling means of this chain assembly shown in Figs. 5 and 6 to effect removal of the set of offset links 45 with their offset coupling link 46, it only becomes necessary to swing the coupling link elements 18 and 46 inwardly around their respective right-hand joint pins 43 and 17 to withdraw the reduced coupling pin portions 21 from the slots 25 of the two coupling links. This removal of the reduced coupling pin portions 21 from the slots 25, of course, is accompanied by snapping of the reduced pin portions past the projections or enlargements 25b formed in the same slots.

After both coupling links have been disconnected from their coupling pins, these two pins may be withdrawn from the holes or apertures of the link elements and the offset links 45 with the offset coupling link element 46 will drop out of the chain assembly. The remaining end sets of link elements then may be fitted together and one of the two coupling pins threaded through the newly aligned holes or apertures. This reinserted coupling pin will be retained in place by the straight coupling link element 18, which is retained in the assembly by the riveted end 44 of its conventional joint pin 43. This straight coupling link 18 is swung about its joint pin 43 and is locked or latched to the reinserted coupling pin 17 by causing the reduced portion 21 of this coupling pin to snap past the projection or enlargement 25b of the slot 25 formed in the coupling 18. With the reduced portion 21 of the reinserted coupling pin 17 occupying the journal portion 25a of the coupling link element 18, the chain assembly is completely recoupled and ready for use.

The chain assembly disclosed in Figs. 7 and 8 is designed to allow for the removal or insertion of any desired odd or even number of pitches. The total number of pitches, or sets of link elements which can be removed is dependent entirely upon the number of coupling pins and coupling link elements included in the assembly.

In this assembly, the conventional link elements are arranged in sets with alternate sets being made up entirely of pairs of the link elements while the remaining sets are made up of three pairs of link elements with single elements arranged at the opposite ends of the sets. A set of offset links 49 also is provided in the assembly. The end portions of these various link elements 48 and 49 are provided with suitable holes or apertures to receive the conventional chain or joint pins 50 or the coupling pins 51. In the illustrated portion of this assembly, only one conventional joint pin 50 is illustrated. This pin is riveted at its opposite ends 52 and is provided with washers 53 inwardly of these ends. All of the remaining pins are coupling pins 51. These coupling pins 51 are each riveted at one end 54 and a washer 55 is associated with this end. The remaining ends of all of the coupling pins are provided with reduced cylindrical portions 56 having enlarged outer heads 57.

In this chain assembly, a radically different form of coupling link element 58 is employed. These coupling link elements are provided with slots 59 at both ends. Each slot is provided with a journal portion 60 and a projection or enlargement 61 which constricts the width of the slot. The journal portions 60 are intended to receive the reduced end portions 56 of the coupling pins 51. Due to the presence of the journal portions 60 of the slots 59, each coupling link element 58 may be swung or pivoted about the coupling pin 51 with which it is associated, for disconnecting the second end of the coupling link element from its coupling pin. This disconnecting, of course, is accompanied by the snapping of the reduced coupling pin portion 56 past the projection or enlargement 61 of its slot 59. Also, each coupling link element 58 may be simultaneously disconnected from both of its coupling pins by being forced inwardly to cause the reduced portions 56 of both of its coupling pins to be simultaneously snapped past their slot enlargements or projections 61. It will be noted that the coupling link elements 58 and the coupling pin heads 57 are arranged at one side of the chain and their weight is balanced or offset at the other side of the chain by the washers 55 and the larger riveted pin heads 54. Due to this arrangement, the chain will be balanced both transversely and longitudinally, or circumferentially.

By disconnecting the proper coupling link elements 58 from their coupling pins 51 and by withdrawing the proper number of coupling pins, the chain may be shortened by two or more pitches, or sets, of conventional link elements.

The conventional link elements 48 of this chain assembly are provided with spaced teeth 62 while the coupling link elements 58 are provided with spaced teeth 63. The teeth of the conventional links and coupling links, therefore, are arranged so that these elements will arch over the teeth of the sprocket wheels on which the chain assembly runs.

Fig. 8 discloses a portion of a sprocket wheel 64 having teeth 65. This figure illustrates the manner in which the coupling link elements arch over the teeth of a sprocket wheel so that this contact with wheels will supplement the snap lock action of the slot enlargements or projections in retaining the coupling link elements connected to their coupling pins. This meshing of a chain with a sprocket, disclosed in Fig. 8, will be sufficient to illustrate this chain and wheel contacting action for all of the remaining chain assemblies shown in the preceding figures.

Fig. 10 discloses in detail a coupling link element of the general type illustrated in Figs. 7 and 8. This figure, therefore, will help to illustrate the action of the coupling link elements of these two figures. It will be noted that this coupling link element 66 is of substantially W-shape in elevation and is formed with the sprocket wheel engaging teeth 67 which are spaced to permit the coupling link to arch over the sprocket wheel teeth. Slots 68 are provided in both end portions of the coupling link elements. Each slot is provided with a journal portion 69 while a projection or enlargement 70 helps to define each journal portion 69 and provides a constriction in each slot 68. The coupling pins 71, with which this coupling link 66 is associated, are provided with reduced portions 72 to be received in the journal portions 69 of the slots.

To disconnect this coupling link element 66 from one of the coupling pins, the link is pivoted or swung around the reduced portion 72 of its second coupling pin. This swinging or pivoting of the coupling link element will be accompanied by the reduced pin portion 72 snapping past the enlargement or projection 70 of its slot 68. To illustrate the extent to which this projection or enlargement 70 obstructs the movement of a coupling pin portion 72 through a slot, the dash lines 73 have been provided. Each one of these dash lines is formed on a radius of the axis of the other coupling pin for the coupling link.

Of course, after the coupling link element is disconnected from one of its coupling pins, it can be readily disconnected from the second coupling pin by forcing the reduced portion 72 of this latter coupling pin past the associated enlargement or projection 70 of its slot. If it is desired to disconnect the coupling link element 66 from both coupling pins simultaneously, it is merely necessary to force the coupling link element downwardly or inwardly so that the reduced portions 72 of both coupling pins will be simultaneously forced or snapped past their associated slot enlargements or projections 70.

Fig. 11 discloses a still further modified form of coupling link element of the general type illustrated in connection with Figs. 7, 8, and 10. This coupling link element 74 is provided with spaced wheel engaging teeth 75. Due to the spacing of these teeth, the coupling link element will be permitted to arch over the teeth of a sprocket wheel. Each end portion of this coupling link element is provided with a slot 76. The inner portion 77 of each slot is of substantially rectangular formation to receive a substantially rectangularly shaped coupling pin portion 78. Each slot 76 is provided with a projection or enlargement 79 which engages a portion of the associated coupling pin for locking the pin in the slot. When the reduced portion 78 of a coupling pin is forced entirely into its slot 76, the pin is compelled to snap past the projection or enlargement 79 with which it is associated. To disconnect this coupling link element 74 from its coupling pins, it is necessary to force the element off of both coupling pins simultaneously.

From the above description of the various chain structures and different types of uncoupling and recoupling means, it will be appreciated that the small silent chains of $\frac{3}{16}$ of an inch pitch may be very quickly and easily handled by a person of limited mechanical ability to accomplish uncoupling and recoupling manipulations of the chain. This is due primarily to the fact that the only parts which need be handled are the coupling pins and the coupling links. No pins need be driven out of the holes or apertures formed in the chain links. No new parts have to be employed in uncoupling or recoupling a chain. No new pins have to be riveted in place. The use of cotters is entirely avoided. In merely uncoupling and recoupling a chain, a coupling pin is the only element which is separated from the assembly. This single element can be easily handled while being withdrawn and reinserted.

Although the several figures disclose coupling means located on but one side of the chain, it will be understood that the coupling means may be duplicated on both sides of the chain if desired. Additionally, coupling pins may be employed throughout the entire length of a chain and coupling link elements associated therewith so that the entire chain may be built up of any desired length or modified in length to suit any occasion or particular installation. While I have only illustrated the coupling means of this invention in connection with silent chains, it will be understood that this coupling means may be employed with other types of chains if so desired.

It is to be understood that the forms of this invention herewith shown and described are to be taken as preferred examples of the same, and that various changes in the shape, size, and arrangement of parts may be resorted to without departing from the spirit of the invention or the scope of the subjoined claims.

Having thus described the invention, I claim:

1. In a power transmission chain of the type wherein the link elements are arranged in transversely aligned sets connected by joint parts comprising pins and with the link elements of each set alternating with the link elements of the next adjacent sets in bearing on the joint parts, a coupling link element of substantially equal thickness to and occupying the position of a regular link at one side of one of said sets and having one of its end portions connected to one joint pin of said set, and an uncoupling and recoupling snap lock connection between the remaining end portion of the coupling link element and the adjacent end portion of the second joint pin of said link element, said connection comprising a transversely arranged slot extending from one edge of the coupling link element and being constricted at a point intermediate its ends, and a reduced portion on the end of the joint pin received in said slot and frictionally held therein by said constriction.

2. In a power transmission chain of the type wherein the link elements are arranged in transversely aligned sets connected by joint parts comprising pins and with the link elements of each set alternating with the link elements of the next adjacent sets in bearing on the joint parts, a coupling link element arranged at one side of one of said sets and having one of its end portions connected to one joint pin of said sets, and an uncoupling and recoupling snap lock connection between the remaining end portion of the coupling link element and the adjacent end portion of the second joint pin for said element, said connection comprising a slot extending transversely from one edge of the coupling link element and being constricted at a point intermediate its ends, and a reduced portion on the end of the joint pin received in the inner end of the slot and held therein by said constriction.

3. In a power transmission chain of the type wherein the link elements are arranged in transversely aligned sets connected by joint parts comprising pins and with the link elements of each set alternating with the link elements of the next adjacent sets in bearing on the joint parts, a coupling link element arranged at one side of one of said sets, an uncoupling and recoupling snap lock connection between each end portion of the coupling link and the adjacent end portions of the two joint pins of said element, each of said connections comprising a slot extending transversely from one edge of the coupling link element and being constricted at a point intermediate its ends, and a reduced portion on the end of the joint pin received in the inner end of the slot and held therein by said constriction.

4. A power transmission chain comprising a plurality of link elements shaped to arch over the teeth of the wheels when in working contact therewith and arranged in transversely aligned sets, joint parts connecting said link elements comprising pins with the link elements of each set alternating with the link elements of the next adjacent sets in bearing on the joint parts, a coupling link element arranged at one side of one of said sets and being shaped like the remaining link elements of its set to arch over the teeth of the wheels, a pivotal connection between one end of the coupling link and one joint pin of said set, and a detachable snap lock connection between the other end of the coupling link and the second joint pin of said set, said snap lock connection comprising a slot extending from one edge of the coupling link and being constricted at a point intermediate its ends, and a reduced portion on the end of the joint pin received in the inner end of the slot and held therein by said constriction.

5. In a power transmission chain, a plurality of link elements shaped to arch over the teeth of the wheels when in working contact therewith and arranged in transversely aligned sets, joint parts connecting said links comprising pins with the link elements of each set alternating with the link elements of the next adjacent sets in bearing on the joint parts, a coupling link element of substantially equal thickness to and occupying the position of a regular link at one side of one of said sets and being shaped like the remaining link elements of its set to arch over the teeth of the wheels, a connection between one end of the coupling link and one joint pin of said set of link elements, and a detachable snap lock connection between the other end of the coupling link and the second joint pin of said link, said snap lock connection comprising a slot extending downwardly from the top edge of the coupling link element and being constricted at a point intermediate its ends, and a reduced portion on the end of the joint pin received in the inner end of the slot and held therein by said constriction.

6. In a power transmission chain, a plurality of link elements arranged to arch over the teeth of the wheels when in working contact therewith and arranged in transversely aligned sets, joint parts connecting said links comprising pins with the link elements of each set alternating with the link elements of the next adjacent sets in bearing on the joint parts, a coupling link element arranged at one side of one of said sets and being shaped like the remaining link elements of its set to arch over the teeth of the wheels, and a detachable snap lock connection between the ends of the coupling link and the two joint pins of said set of link elements, said snap lock connections each comprising a slot extending downwardly from the top edge of the coupling link element and being constricted at a point intermediate its ends, and a reduced portion on the end of the joint pin received in the inner end portion of the slot and held therein by said constriction.

7. In a power transmission chain, a plurality of link elements shaped with spaced teeth to arch over and engage the teeth of the wheels when in working contact therewith and arranged in transversely aligned sets, one of said sets being formed of offset link elements, joint parts connecting said links comprising pins with the link elements of each set alternating with the link elements of the next adjacent sets in bearing on the joint parts, coupling link elements arranged at one side of the chain to permit the set of offset link elements to be removed from the chain, said coupling link elements each being shaped with spaced teeth to arch over and engage the teeth of the wheels, a connection between one end of each one of said coupling links and one of its joint pins, and a snap lock connection between the other end of each coupling link and its second joint pin, said snap lock connections each comprising a slot extending downwardly from the top edge of the coupling link element and being constricted at a point intermediate its ends, and a reduced portion on the end of the joint pin received in the inner end of the slot and held therein by said constriction.

8. In a power transmission chain, a plurality of link elements shaped to arch over the teeth of the wheels when in working contact therewith and arranged in transversely aligned sets, one of said sets being formed of offset link elements, joint parts connecting said links comprising pins with the link elements of each set alternating with the link elements of the next adjacent sets in bearing on the joint parts, a coupling link element arranged at one side of each of said set of offset link elements and a next adjacent set, the coupling link element arranged at the side of offset link elements also being offset, said coupling link elements for both sets being shaped to arch over the teeth of the wheels, a pivotal connection between one end of each of the coupling links and the joint pin for said ends, and a detachable snap lock connection between the other end of each coupling link and the second joint pin thereof.

HAROLD S. PIERCE.